US006739217B2

(12) United States Patent
Hartranft et al.

(10) Patent No.: US 6,739,217 B2
(45) Date of Patent: May 25, 2004

(54) SOFT-GRIP WIRE STRIPPER

(75) Inventors: Bruce W. Hartranft, St. Charles, IL (US); Bruce P. Konen, Aurora, IL (US); Scott Huff, Aurora, IL (US)

(73) Assignee: Ideal Industries, Inc., Sycamore, IL (US)

( * ) Notice: Subject to any disclaimer, the term of this patent is extended or adjusted under 35 U.S.C. 154(b) by 0 days.

(21) Appl. No.: 10/050,871

(22) Filed: Jan. 8, 2002

(65) Prior Publication Data

US 2003/0126955 A1 Jul. 10, 2003

(51) Int. Cl.$^7$ ................................................. H02G 1/12
(52) U.S. Cl. ............................. 81/9.4; 81/417; 81/900; 81/427.5; 81/331; 30/262
(58) Field of Search ......................... 81/9.4, 417, 900, 81/427.5, 489, 318–321, 324, 331, 333; 30/261, 262, 92–95, 111–112, 116, 194, 249–250, 345, 179; 72/409.01

(56) References Cited

U.S. PATENT DOCUMENTS

| 134,030 | A | * | 12/1872 | Brady | 30/112 |
| 3,089,241 | A | * | 5/1963 | Batdorf | 30/226 |
| 4,074,597 | A | * | 2/1978 | Jansson | 81/417 |
| 5,297,343 | A | * | 3/1994 | Melter et al. | 30/262 |
| 5,730,662 | A | * | 3/1998 | Rens | 81/489 |
| 6,336,272 | B1 | * | 1/2002 | Lee | 30/262 |

\* cited by examiner

*Primary Examiner*—D. S. Meislin
(74) *Attorney, Agent, or Firm*—Cook, Alex, McFarron, Manzo, Cummings & Mehler, Ltd.

(57) ABSTRACT

A wire stripper has a pair of elongated frames pivotably joined together by a pivot pin and defining handles and jaws. The handles are covered by sleeves which include thumb wells which cover the ends of the pivot pin. A mechanical interlock is provided between the handles and the sleeves. The sleeves have slots for receiving the handles. The slots are offset so the front and rear surfaces of opposite sleeves are coplanar. The sleeves have a core and cushion grip overmolded on the core. A molding projection on the core allows precise placement of the core in a mold during formation of the cushion grip. A spring biases the frames to an open position. A locking member can be set by a sliding motion toward the handle end to hold the handles in a closed position. A curved shoulder on the edge of a handle wipes across a screw hole opening in the opposite jaw to provide a screw cutting function with a slicing action.

16 Claims, 7 Drawing Sheets

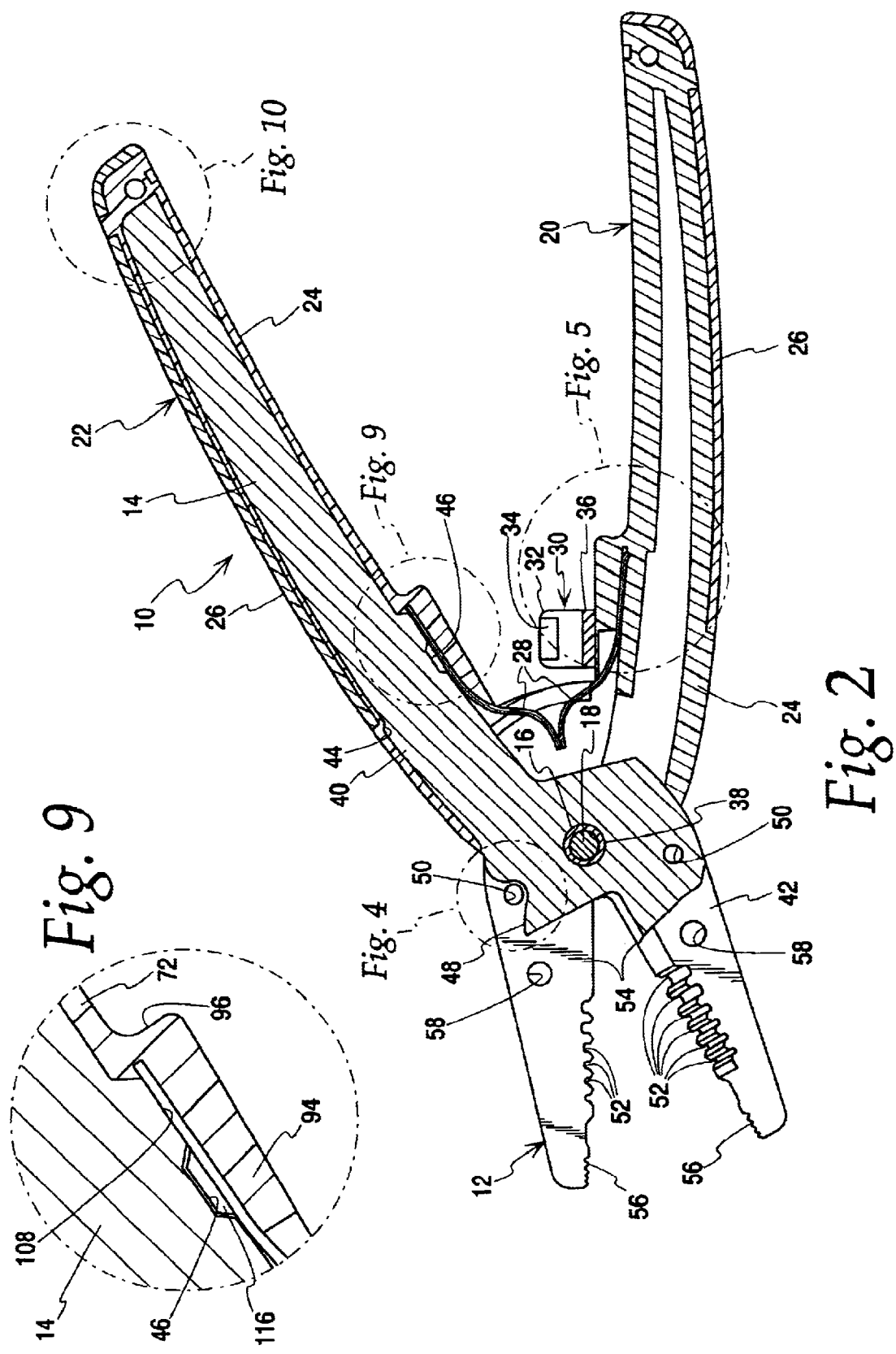

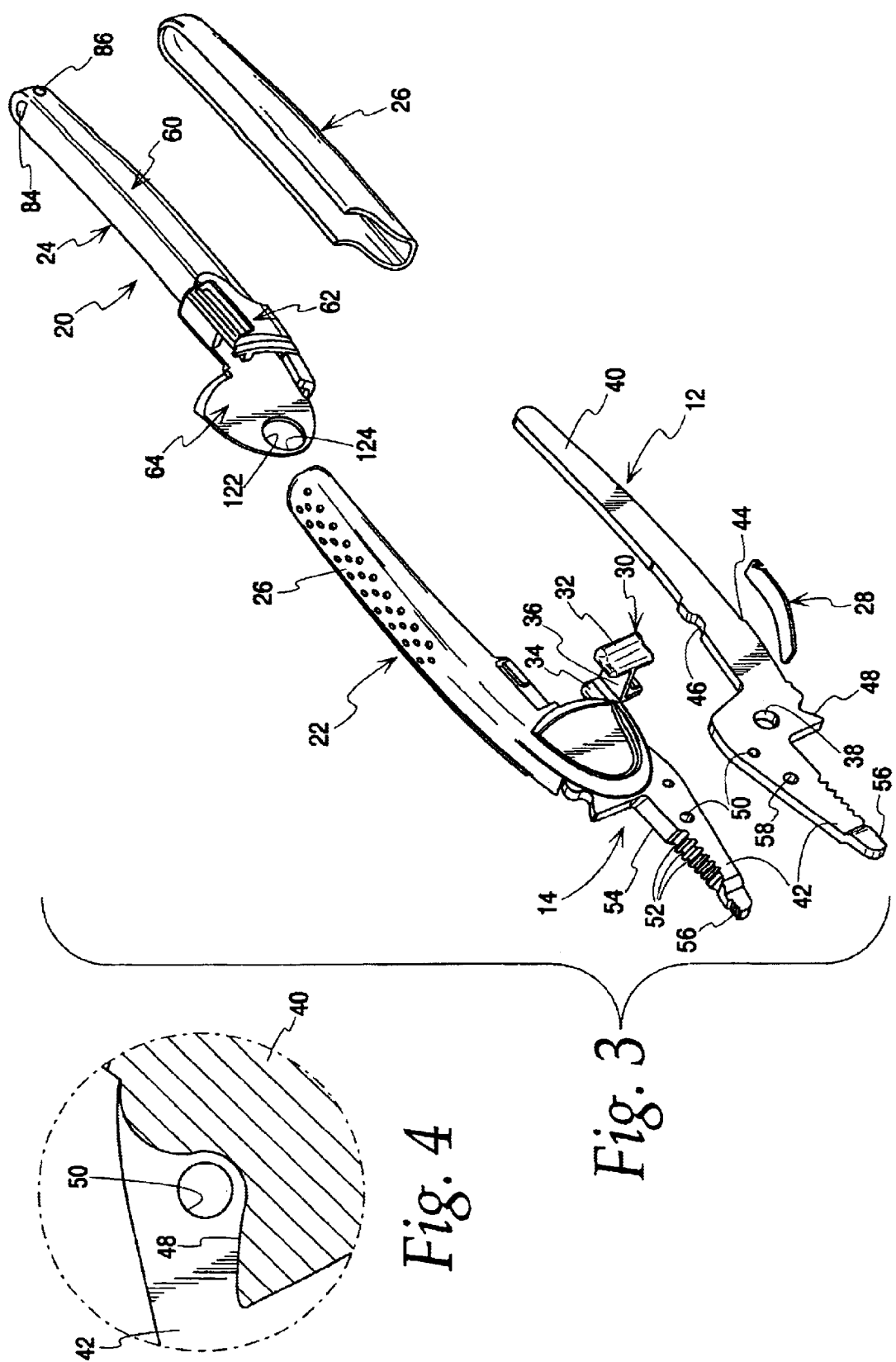

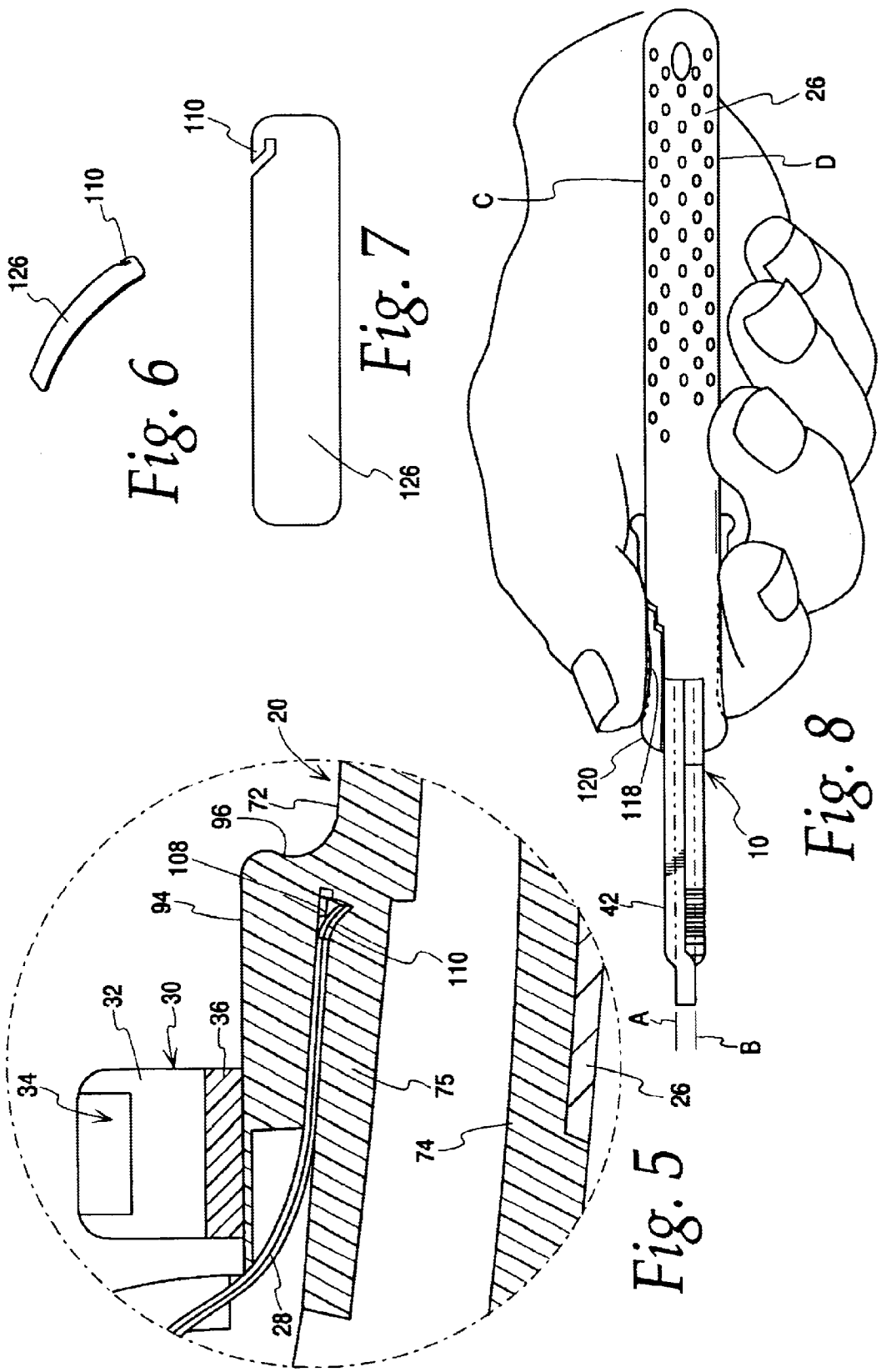

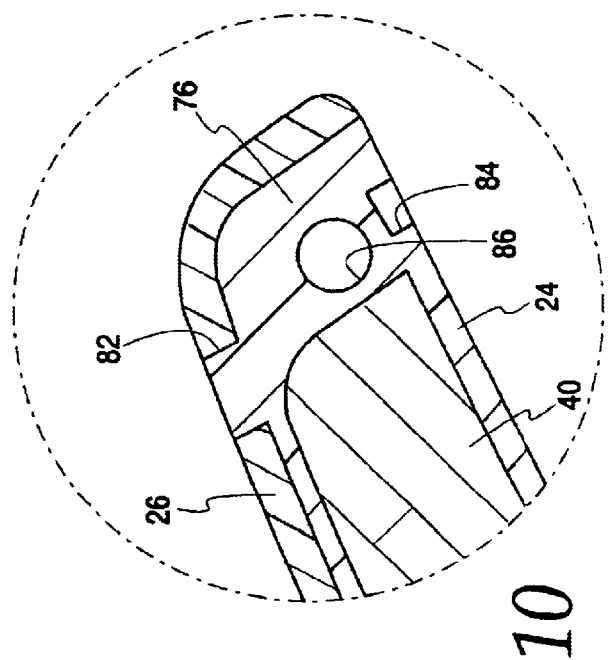
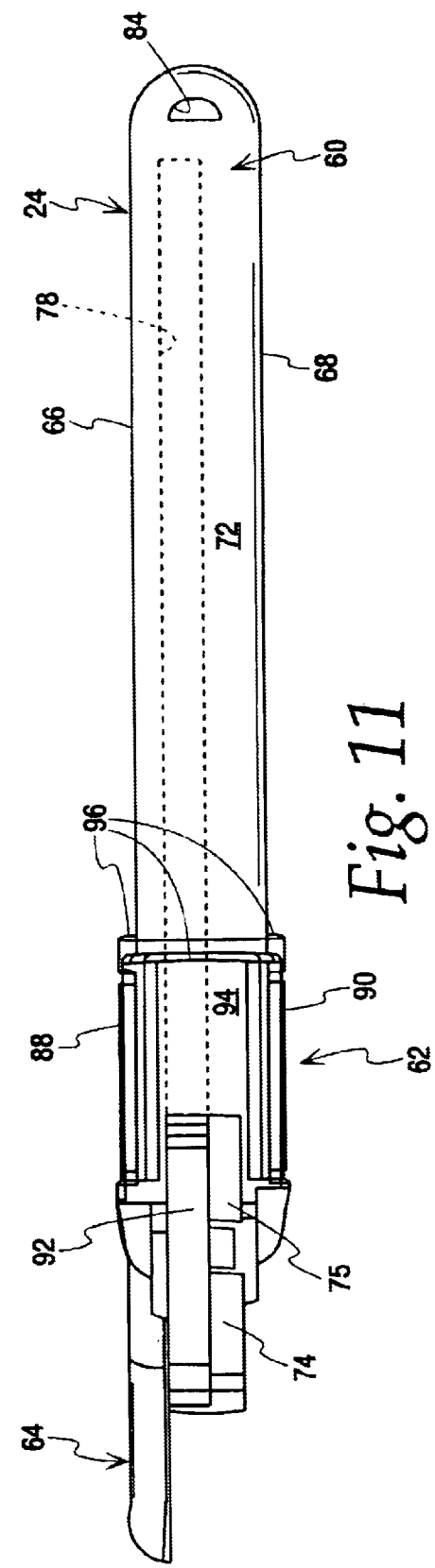

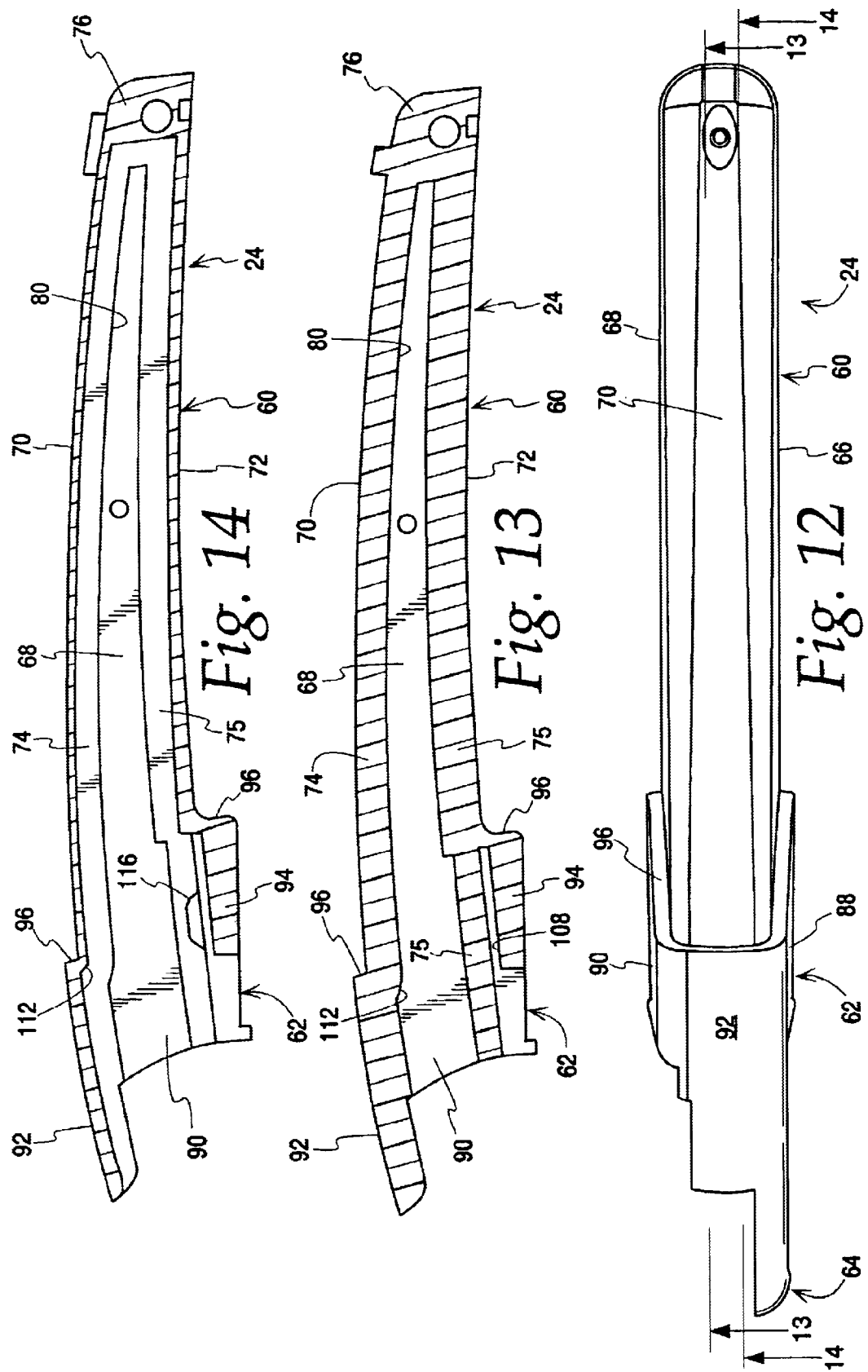

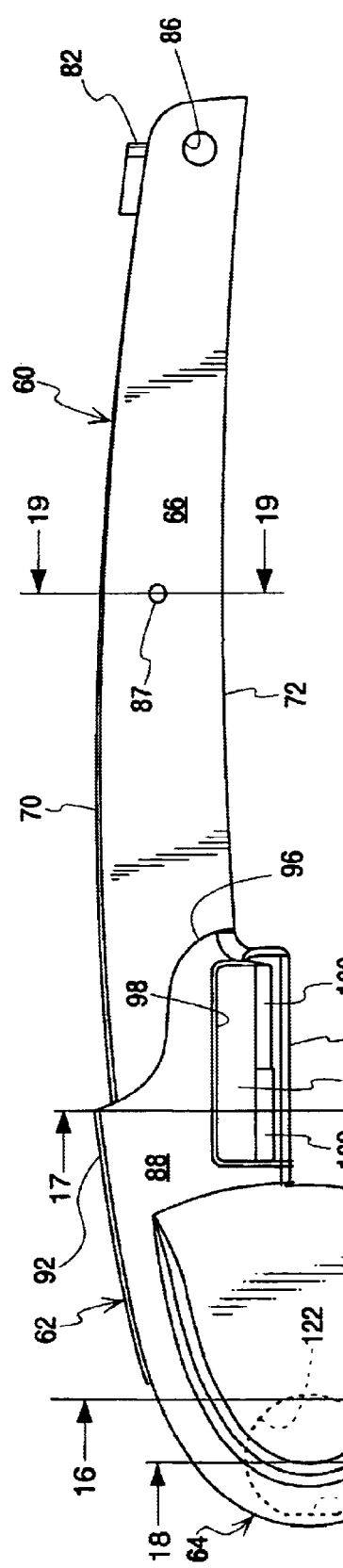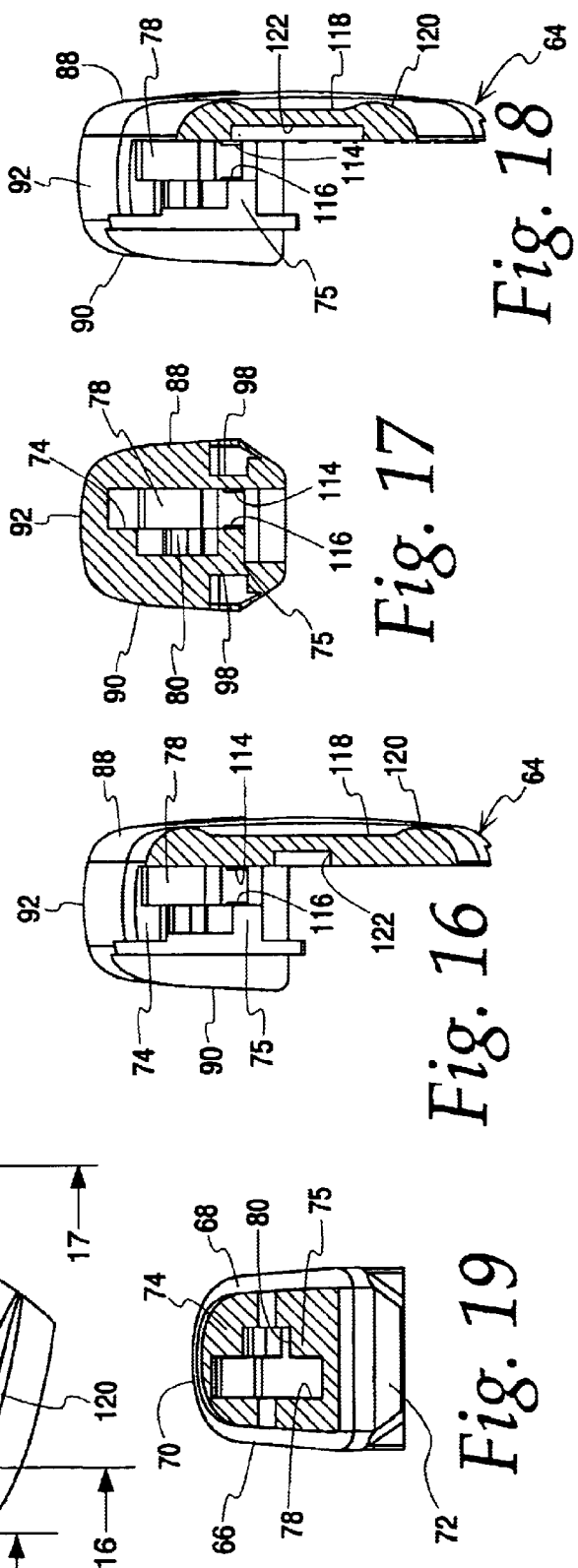

SOFT-GRIP WIRE STRIPPER

BACKGROUND OF THE INVENTION

Electricians have long used hand-held wire strippers for basic operations such as wire stripping and cutting. These tools are constructed similarly to a pair of pliers in that they have a pair of elongated members pivotably joined at a pivot pin. The pivot pin defines handles below the pin and jaws above the pin. The jaws typically incorporate wire cutting blades and aligned pairs of semi-circular grooves sized for stripping insulation from wires. The handles fit in the palm of a user's hand. U.S. Pat. No. 6,234,050 shows one type of hand-held wire stripper having ergonomic handles.

Studies of how electricians actually use wire strippers have revealed that the basic wire stripping function is performed by holding the handles of the tool in the palm of the hand with four fingers wrapped around one of the handles. The thumb typically rests on or close to the pivot pin as this is the only portion of the tool that doesn't exhibit appreciable movement during closure of the jaws on a wire. Once the fingers close the handles to cause the jaws to cut a wire's insulation, the resulting slug is usually removed by sideways pivoting motion of the wrist. This flick of the wrist is in the nature of a yawing motion of the wrist, rather than a rolling motion about the forearm or a full sideways translation of the forearm. To effect the yaw of the wrist and overcome the resistance of the slug on the conductor, the thumb is pressed against the pivot pin to push the tool in the desired direction. One of the problems with prior art wire strippers is the pivot pin is not designed to support the thumb and thus creates discomfort in the short run and a real pain in the thumb over long term use. The ends of the pivot pin often present a shape, such as a screw head or a nut, that is not conducive to user comfort. Furthermore, the pin is prone to pinching the thumb during movement of the handles. Repetitive use of the tool, of course, exacerbates these problems. The present invention recognizes the reality of how handheld wire strippers are used and accommodates the thumb by placing a thumb well over the pivot pin.

Other deficiencies in prior art tools that at first glance seem but minor nuisances can develop into major aggravations over long term use. For example, some electricians prefer a wire stripper that is spring-loaded to open the jaws. During periods of non-use the wire stripper is closed to minimize its size. A locking mechanism is set to retain the tool in the closed position against the bias of the spring. Often the closed tool is slipped into a pocket or a tool belt so the user's hands are free for other tasks. This is usually done with the jaws leading or pointing into the pocket since the user typically is grasping the handles. Unfortunately, the action of sliding the tool into the pocket or tool belt loop often releases the locking mechanism, allowing the spring to open the jaws. This interferes with subsequent removal by spreading the handles apart, making them more difficult to grasp. Also, the open jaws may not allow them to clear a belt loop or otherwise be extracted from a pocket. The present invention resolves this by orienting the lock so that a jaws-first insertion of the tool into a pocket tends to set the lock, not open it.

Another bothersome aspect of prior art tools is the screw cutting apparatus. Sometimes tools of this type have holes in the handles or jaws near the pivot pin for cutting 6–32 and 8–32 size screws to a desired length. Holes in opposite handles or jaws can be aligned with one another when the handles are open so that a screw can be inserted through the aligned holes. Subsequent closing of the handles causes separation of the two holes, thereby shearing off a screw inserted therein. While this arrangement of dual holes does permit cutting screws to a desired length, it requires excessive force to do so.

SUMMARY OF THE INVENTION

The present invention relates to hand tools used by electricians and particularly to an improved wire stripper. The wire stripper of the present invention has several features that enhance its ease of use and the comfort of the user.

The wire stripper includes two elongated frames made of steel. The frames lie in adjacent planes and are pivotably connected to one another by a pivot pin. The pivot pin has first and second end portions. The pin defines handles and jaws in the elongated frames. The handles and jaws define a longitudinal center line of the tool. The jaws are movable between open and closed positions such that cutting blades and aligned pairs of semi-circular grooves in the blades can cut and strip electrical wires.

Each handle is covered by a sleeve which includes a core portion and a cushioned grip portion molded over the core. The core has a molding projection extending from one surface a distance about equal to the thickness of the cushioned grip. This allows the core to be precisely located in the mold during over-molding of the cushioned grip. The sleeves receive the handles in a slot which is offset from the longitudinal center line of the sleeve. This allows the exterior edges of the sleeves to be aligned in the same planes even though the elongated frames are in separate planes. A pair of protrusions extend into the slot and interfit with grooves in the elongated frames to retain the sleeve on the handle. Each sleeve also has a thumb well which covers one of the end portions of the pivot pin so both ends of the pin are covered.

A pair of springs bias the elongated frames to the open position. The springs are disposed in slots formed in the sleeves. A barb on the springs engages the sleeve to retain the springs in the slot. A locking member mounted on one of the sleeves is releasably engageable with the other of the sleeves to selectably hold the elongated frames in the closed position. The locking member is locked or set by linear movement along the longitudinal axis toward the handle ends of the tool so that a jaws first insertion of the tool into a pocket or pouch tends to lock the locking member.

In addition to the cutting blades and wire stripping grooves mentioned above, the tool of the present invention also includes an improved screw cutting feature. Each jaw includes a screw hole adapted for receiving a screw. A side edge of the opposite handle terminates at a shoulder. The shoulders and screw holes are arranged such that when the elongated frames are in an open position the elongated frames are not in alignment with the screw holes. As the elongated frames move to a closed position the shoulder moves across the entire screw hole to sever a screw protruding from the hole. The shoulder has a curved surface to provide a slicing action that reduces the force required to cut the screw, as compared to the dual hole arrangement of the prior art.

BRIEF DESCRIPTION OF THE DRAWINGS

FIG. 2 is a longitudinal section taken through one of the elongated frames.

FIG. 3 is an exploded perspective view of the wire stripper

FIG. 4 is an enlarged detail view of the area encircled and labeled FIG. 4 in FIG. 2, showing the screw cutting shoulder.

FIG. 5 is an enlarged detail view of the area encircled and labeled FIG. 5 in FIG. 2, showing the spring and its mounting slot in a sleeve.

FIG. 6 is a perspective view of a single lamina of the leaf spring.

FIG. 7 is a plan view of a single lamina of the leaf spring.

FIG. 8 is a plan view of the wire stripper in the grasp of a user.

FIG. 9 is an enlarged detail view of the area encircled and labeled FIG. 9 in FIG. 2, showing the groove in the elongated frame handle for interlocking with the sleeve.

FIG. 10 is an enlarged detail view of the area encircled and labeled FIG. 10 in FIG. 2, showing the molding projection and depression in the sleeve core.

FIG. 11 is a plan view of the inside edge of a sleeve core.

FIG. 12 is a plan view of the outside edge of a sleeve core.

FIG. 13 is a section taken along line 13—13 of FIG. 12.

FIG. 14 is a section taken along line 14—14 of FIG. 12.

FIG. 15 is a front elevation view of a sleeve core.

FIG. 16 is a section taken along line 16—16 of FIG. 15.

FIG. 17 is a section taken along line 17—17 of FIG. 15.

FIG. 18 is a section taken along line 18—18 of FIG. 15.

FIG. 19 is a section taken along line 19—19 of FIG. 15.

DETAILED DESCRIPTION OF THE INVENTION

Figure 1:
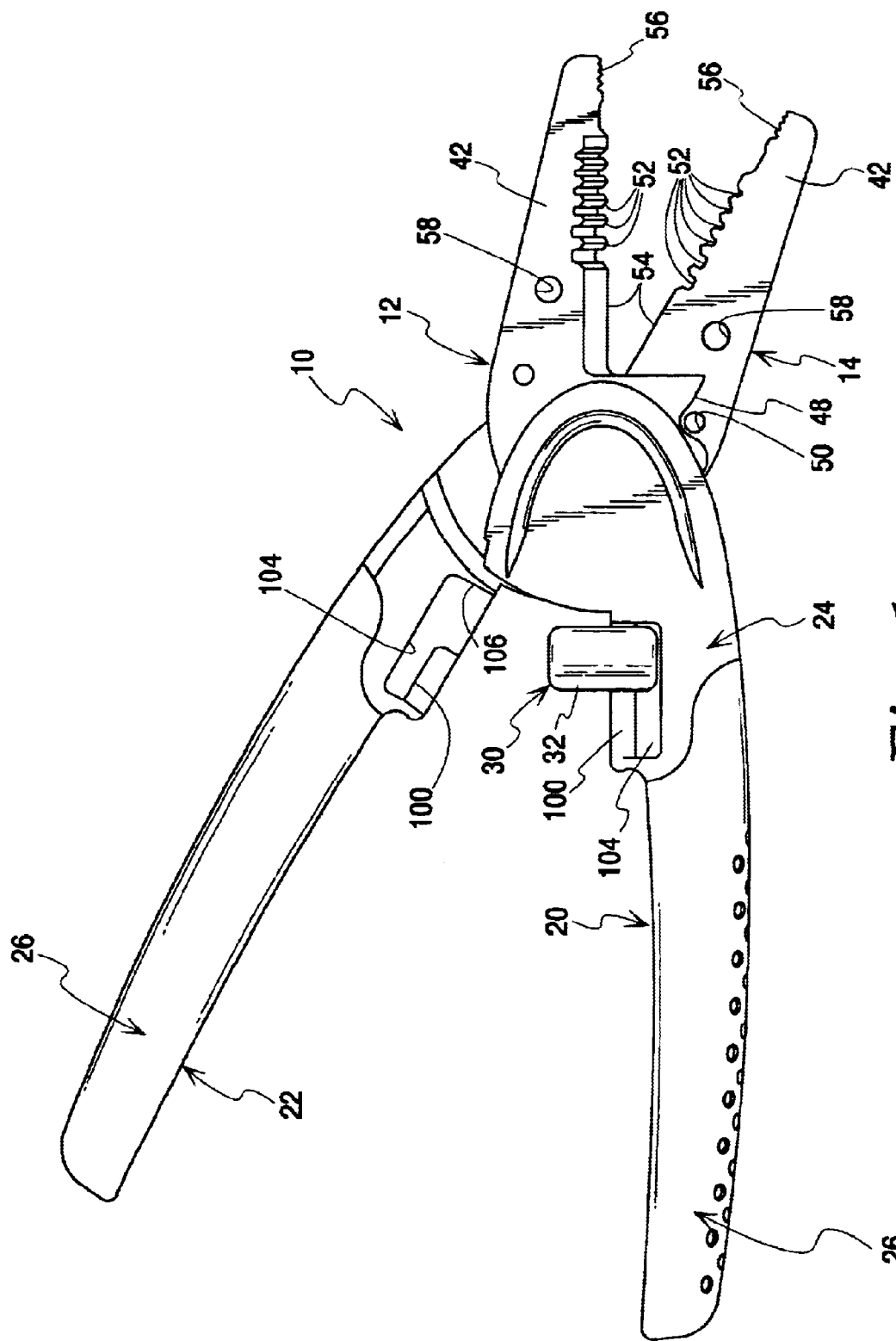
FIG. 1 is a front elevation view of the wire stripper of the present invention, shown in an open position.

The soft-grip wire stripper assembly of the present invention is shown generally at 10 in FIGS. 1–3. The wire stripper includes first and second elongated frames 12 and 14. The elongated frames are pivotably joined together by a pivot pin. The pivot pin preferably includes an internally threaded bushing 16 and a screw 18 that threads into the bushing. Each of the bushing and screw has a head (not shown). The heads engage a face of the frames 12 or 14 to hold them together in pivotable relation. The pivot pin generally divides the elongated frames into a handle portion and a jaw portion. The elongated frames are movable between an open position, shown in FIGS. 1 and 2, and a closed position in which the noses of the jaws engage one another and the cutting edges overlap somewhat.

The handles of the elongated frames are covered by first and second sleeves 20 and 22. Each sleeve includes a core 24 and a cushioned grip 26. The grip 26 is preferably over-molded on the core and is made of soft, thermoplastic elastomer such as Santoprene®, a trademark of Advanced Elastomer Systems, LP. The handles are biased apart by a pair of leaf springs 28. The leaf springs each have one end captured in a slot in one of the sleeve cores 24. The opposite ends of the springs converge on one another as the handles are moved toward the closed position. This normally urges the handles to the open position. An H-shaped locking member 30 engages the first sleeve and selectably engages the second sleeve to hold the handles and jaws in a closed position. The locking member includes two uprights 32 each having inwardly-directed tabs 34 at the top and bottom thereof. A centrally mounted crossbar 36 joins the uprights 32 between the top and bottom tabs 34.

Details of the elongated frame 14 are shown in FIGS. 2 and 3. Only one of the frames will be described since they are essentially identical to one another. The frame is a generally planar, steel stamping having a pivot aperture 38. The aperture 38 divides the frame into a handle portion 40 and a jaw portion 42. The outer edge of the handle includes a notch at 44. A groove 46 is formed on the inner edge of the handle. The notch and groove interact with the sleeve in a manner that will be described below. The outer edge of the handle near the pivot aperture 38 has an indentation that defines a shoulder 48. The shoulder cooperates with a screw hole 50 in the other frame to provide a screw cutting feature. The screw holes 50 are internally threaded to receive a screw. Preferably the screw holes in the two jaws are different sizes, e.g. a 6-32 hole and a 8-32 hole, so that two different size screws can be cut. This is the only difference between the two frames 12 and 14. As seen in FIGS. 1 and 2, when the handles and jaws are in an open position the shoulder 48 is spaced from or remote from the screw hole 50 of the mating frame. This permits a screw to be threaded through the hole 50, exposing the portion of the screw to be cut off. Closing the handles causes the shoulder to slide across the face of the opposing jaw, thereby slicing off the protruding portion of the screw. Note in FIG. 4 that the shoulder 48 has a curved shape which provides a slicing action when cutting a screw. The curved surface of the shoulder greatly reduces the amount of force needed to cut a screw, compared to the dual hole arrangement used in prior art tools.

The jaw 42 further includes a series of generally semi-circular grooves 52 of varying diameters. The grooves are preferably ground in the edge of the jaw. These grooves match with similar grooves on the other jaw to provide an insulation cutting function. A cutting blade or edge 54 is located on the edge of the jaw between the grooves 52 and the pivot aperture 38. The opposed cutting blades can be used to sever a wire. The other end of the jaw has an offset nose portion 56. This portion is located out of the plane of the rest of the frame so that it aligns with the mating nose of the other frame. The opposed nose portions provide a gripping function. The remaining feature of the jaw is a wire looping hole 58.

Turning now to FIGS. 11–19, details of the sleeve core 24 will be described. The core portions of the first and second sleeves are substantially identical. The only differences are in the constructions of the locking member races, which will be described below. The sleeve 24 is preferably an integrally-molded, polypropylene member comprising three major portions, an elongated handle section 60, a central transition section 62 and a thumb well 64. The handle section and transition section have a generally box-like construction while the thumb well is a plate-like member. In the following description of these sections the side of the sleeve having the thumb well thereon will be referred to as the front of the sleeve while the opposite side will be referred to as the rear side of the sleeve. Similarly, the edge of the sleeve farthest from the longitudinal centerline of the assembled wire stripper will be called the outer or outside edge. The edge closest to the longitudinal centerline will be called the inner or inside edge. It will be understood that these designations are for reference purposes only since the generally symmetrical shape of the tool renders the labeling of any one side as the "front" side or any edge as the "outside" edge somewhat arbitrary.

Looking first at the handle section 60, it includes a front wall 66, a rear wall 68, an outside edge wall 70 and an inside edge wall 72. Upper and lower ledges 74, 75 are formed in the interior of the handle, at the junction of the rear wall 68 and the edge walls 70 and 72. The ledges 74, 75 also extend through the transition section 62 as well. The walls and ledges terminate distally at an end block 76. Together the walls and ledges define a hollow main slot 78 that extends throughout the length of the handle to the end block 76. The slot receives the handle 40 of an elongated frame 12 or 14. There is also a secondary slot 80 between the ledges 74 and 75. As best seen in FIGS. 11 and 19, the main slot 78 is offset from the longitudinal center line of the handle. In other words, the main slot 78 is closer to the front wall 66 than it is to the rear wall 68. The purpose of offsetting the main slot is to compensate for the fact that the handles 40 of the first and second frames 12 and 14 lie in adjacent but separate planes A and B (FIG. 8). There is no jog or offset in the frames (other than the limited offset at the nose 56) to align the handles 40 in the same plane. However, the offset main slot 78 aligns the sleeve surfaces. When both sleeves are mounted on the elongated frames the front wall 66 of the first sleeve 20 will be coplanar with the rear wall 68 of the second sleeve 22, as indicated by plane C in FIG. 8. Similarly, the front wall of the second sleeve 22 will be coplanar with the rear wall of the first sleeve 20, as indicated by plane D in FIG. 8. Since the cushioned grips on both sleeves have equal thicknesses, it follows that the front and rear surfaces of the cushioned grips on opposite sleeves will be coplanar. This improves the look and feel of the wire stripper.

The handle section 60 of the sleeve core 24 includes several features that aid in the over-molding of the cushioned grip 26 onto the core. Two of these features are best seen in FIGS. 11–15. A molding projection 82 extends upwardly from the surface of the outside edge wall 70 a distance equal to the thickness of the cushioned grip 26. The projection 82 provides a small area where a pin built into the over-molding tool (not shown) can engage the free end of the core and fix it in a known position. Similarly, a molding depression 84 is formed in the inside edge wall 72 at the end block 76. Although the cushioned grip does not cover the inside edge wall (and thus the depression is neither filled nor surrounded by the cushioned grip), the depression 84 provides another location where the over-molding tool can engage and fix the location of the core in the tool so the dimensions of the over-molded cushioned grip can be precisely controlled. FIG. 10 illustrates how the cushioned grip 26 surrounds the molding projection 82 but does not cover it. A cross hole 86 through the end block 76 is used during molding of the core as a location for gripping the finished core to pull it off the pin that forms the main and secondary slots. The cross hole 86 as well as the smaller transverse hole 87 (FIG. 15) are plugged prior to over-molding of the cushioned grip material.

Turning now to the sleeve transition section 62, this section includes front and rear walls 88 and 90 joined by an outside edge wall 92 and an inside edge wall 94. These walls join the corresponding walls in the handle portion 60 at a boundary wall 96. As seen in FIGS. 12–15, the boundary wall 96 is upraised from the front, rear and outside edge walls of the handles 60. Thus, the boundary wall 96 provides a well-defined shutoff for over-molding the cushioned grip.

The lower or inside portions of the front and rear walls 88, 90 each include a race which receives the locking member 30. As mentioned above the races on the first and second sleeves are different. The first sleeve 20 carries a full race on the front and rear walls. The second sleeve 22 has a half race on its front and rear walls. The full race is best seen in FIGS. 15 and 17. The race is defined by a depression 98 in the front and rear wall which is bounded along the lower edge by an upraised rim having first and second halves 100 and 102.

The first rim half 100 protrudes upwardly from the surface of the depression somewhat more than the second rim half 102. Between the rim and the front or rear walls the depression defines a slot 104 which receives one of the tabs 34 of the locking member 30. During assembly of the wire stripper the locking member uprights 32 and crossbar 36 flex slightly to permit the tabs to slip over second rim half 102 and into the slots 104. The locking member is thereafter permanently retained in the full race. The tabs are slidable in the slots 104 between a locking position and an open position. The crossbar 36 is slidable adjacent the inside edge wall 94 (see FIGS. 2 and 5). When the locking member 30 is aligned with the first rim half 100, i.e., closest to the handle section 60, the member is in the locking position. When the locking member 30 is aligned with the second rim half 102, i.e., closest to the thumb well 64, the member is in the open position. The increased protrusion of the first rim half compared to the second rim half prevents the locking member 30 from falling to the locking position by gravity. In other words, there is a slight interference between the first rim half 100 and the uprights 32 that is easily overcome by the user deliberately actuating the locking member but will not be overcome by gravity. The second rim half 102 does not have this interference with the uprights.

The half race on the second sleeve core is the same as the full race except the second rim half is missing. This is best seen in FIG. 1. Preferably an insert in the tool that molds the core is used to prevent formation of the second rim half. The missing second rim half provides an access opening at 106 for the tabs 34 to move transversely of the sleeve in and out of the slots 104 in the half race as the wire stripper is closed and opened. When the stripper is closed and it is desired to retain the frames 12, 14 in the closed position, the user slides the locking member toward the locking position, i.e., toward the handle end of the tool. The tabs 34 of the locking member will then engage the first rim halves 100 on both sleeves. This prevents the elongated frames from opening. They can only open when the user slides the locking member 30 toward the thumb wells 64 to align the tabs 34 in the second sleeve's half race with the access opening 106. This allows the tabs to escape the half race and thereby permit the handles to separate. The tabs in the first sleeve's full race will remain engaged with the second rim halves 102 so the locking member cannot be separated from the first sleeve.

Along these lines it should be noted that the locking member is moved to a locking position by moving it away from the jaws 42. This means that when the wire stripper is inserted jaws first into a pocket or tool belt, any snagging of the locking member will tend to force the locking member to the locking position and not to the open position. This will prevent inadvertent unlocking of the locking member.

Other features of the transition section 62 include a mounting slot 108 for the leaf spring 28. In FIG. 13 it will be noted that the boundary wall 96 at the inside edge walls 72 and 94 permits the inside edge wall 94 of the transition section to be somewhat downwardly spaced from the inside edge wall 72 of the sleeve handle portion 60. This spacing opens up the slot 108 between the interior face of the inside edge wall 94 and the continuation of the lower ledge 75. It will be noted in FIG. 16 that the lower ledge 75 extends below the secondary slot 80 only and not under the main slot 78. Accordingly, only about half the width of the leaf spring 28 fits in the slot 108 while the other half is supported only by the inside edge wall 94. However, this is sufficient to retain the leaf spring in position because the leaf spring includes a barb 110 (see FIGS. 6 and 7) that engages the lower ledge 75 (see FIG. 5) and prevents any dislocation of the spring.

The interior of the transition section 62 includes two features that assist in retaining the sleeve on the elongated frame. The first of these is the interior corner 112 (FIGS. 13 and 14) defined by interior of the boundary wall 96 along the outside edge wall 92. Corner 112 engages the notch 44 on the outer edge of the handle 40 to locate the sleeve. Also, first and second protrusions 114 and 116 (FIGS. 14 and 16–18) are formed on the inside surfaces of the front wall 88 and the lower ledge 75, respectively. These protrusions extend transversely of the sleeve such that they fit into the handle groove 46 from opposite side of the groove. The protrusions 114, 116 interlock with the groove 46 to hold the sleeve on the handle 45.

The thumb well 64 extends forwardly from the transition section 62. More specifically, the thumb well is an extension of the front wall 88. The front surface of the thumb well defines a shallow hollow 118 surrounded at the front by a flange 120. The flange assists in locating a user's thumb on the face of the thumb well hollow 118 and helps prevent the thumb from sliding forwardly off the well and onto the jaws 42. The rear surface of the thumb well has a socket 122 with a flat edge 124 (FIG. 15) on one side for receiving the head of the pivot pin. The flat edge 124 engages one side of a hex head on the pivot pin screw or bushing. This affords a further sleeve retention feature. As can be seen in FIG. 1, the thumb well covers all of the pivot pin. The entire sleeve covers virtually all of the handle portion 40 of the elongated frames, with the slight exception of the shoulder area 48. This permits the user to place the handles of the wire stripper in the palm of his or her hand with the fingers wrapping around one handle and the thumb resting in the thumb well, as shown in FIG. 8. The thumb well prevents user contact with the pivot pin, jaws or handles and provides a comfortable grip for performing the wrist flicking motion described above.

The construction of the leaf springs 28 is best seen in FIGS. 5–7. Each spring 28 comprises a pair of curved lamina 126 placed one atop the other. The lamina 126 are shown individually in FIGS. 6 and 7. Each lamina includes the barb 110. Preferably the lamina are made of 0.015 inch thick stainless steel, although other materials could be used.

While a preferred form of the invention has been shown and described, it will be realized that alterations and modifications may be made thereto without departing from the scope of the following claims. For example, while a pivot bushing and locking screw has been shown, other alternatives are possible such as a rivet or a simple screw and nut, possibly in combination with a spacer. Also, the ergonomic handle shape of U.S. Pat. No. 6,234,050 could be used instead of the arcuate shape shown. In that case the sleeve would have to be made without the box construction illustrated above. Instead the sleeve would be a flexible, flat piece with the cushioned grip over-molded so the sleeve will slide over the complex shape of the ergonomic handle. Furthermore, while the thumb well has been shown integrally formed with the transition section and handle of the sleeve, it is possible to form the thumb well separately from the sleeve and attach it directly to the frames or the pivot pin. Another possible alternate is to form the thumb well with a flat or perhaps slightly convex surface instead of the concave structure shown. While the concave shape is preferred because it has the benefit of comfortably receiving the thumb, the objective of covering the ends of the pivot pin can also be achieved with a well that is not concave.

We claim:
1. A hand tool, comprising:
   first and second elongated frames;
   a pivot pin extending through the first and second elongated frames to pivotably join them, the pivot pin having a first and second end portions; and
   first and second thumb wells connected to the hand tool and covering the first and second end portions of the pivot pin.
2. The hand tool of claim 1 wherein the first and second elongated frames define a handle, a jaw and a longitudinal axis, the frames being movable between open and closed positions, the tool further comprising:
   a locking member permanently engageable with one of the elongated frames and releasably engageable with the other of the elongated frames to selectably hold the elongated frames in the closed position, the locking member being engageable with said other of the elongated frames by movement along the longitudinal axis toward the handles of said elongated frames.
3. The hand tool of claim 1 wherein the first and second elongated frames define a handle and a jaw, the frames being movable between open and closed positions, the tool further comprising a sleeve mounted over at least one of the handles, the sleeve including a slot formed therein and a spring disposed in the slot and having a barb engaging the sleeve to retain the spring in the slot.
4. The hand tool of claim 1 further comprising a hole in the first elongated frame adapted for receiving a fastener, said hole being the only support for the fastener, the second elongated frame having an edge which terminates at a shoulder, the first and second frames lying adjacent one another, the first and second elongated frames being movable between open and closed positions, the shoulder and hole being arranged such that when the elongated frames are in an open position the second elongated frame is non-aligned with the hole and as the elongated frames move to a closed position the shoulder moves across the entire hole to sever a fastener protruding from the hole.
5. The hand tool of claim 4 wherein the portion of the shoulder that moves across the hole has a curved configuration.
6. The hand tool of claim 1 wherein the first and second elongated frames each includes a handle and a jaw, the handle having a free end and being connected at its other end to the jaw, the frames each defining a plane, and further comprising a sleeve mounted over at least one of the handles, one of the sleeve and said one handle including a groove and the other including a protrusion, the groove being spaced from the free end of the handle, and the protrusion extending transversely to the plane of the frame, the groove and protrusion interfitting with one another to retain the sleeve on said one handle.
7. The hand tool of claim 1 wherein the first and second elongated frames each include a handle and a jaw and further comprising a sleeve mounted over at least one of the handles, the sleeve including a core and a cushioned grip portion molded over the core, the core having a molding projection extending from one surface thereof a distance about equal to the thickness of the cushioned grip such that end of the molding projection is not covered by the cushioned grip.
8. The hand tool of claim 1 wherein the first and second elongated frames each include a handle and a jaw and the first and second frames lie adjacent one another in separate planes, and further comprising first and second sleeves mounted on the handles of the first and second elongated frames, respectively, each sleeve having front and rear walls joined by inside and outside edge walls, said front and rear walls and inside and outside edge walls defining a hollow slot in the sleeve for receiving a handle, the slot being offset from the center line between the front and rear walls such that the front wall of the first sleeve and the rear wall of the second sleeve are generally coplanar in one plane and the front wall of the second sleeve and the rear wall of the first sleeve are generally coplanar in a different plane.

9. The hand tool of claim 1 wherein the thumb well includes a shallow hollow and an upraised flange at least partially surrounding said hollow.

10. A hand tool, comprising:

first and second elongated frames, each including a handle and a jaw;

a pivot pin extending through the first and second elongated frames to pivotably join them, the first and second elongated frames being movable between open and closed positions, the joined first and second elongated frames defining a longitudinal axis of the hand tool;

a locking member permanently engageable with one of the elongated frames and releasably engageable with the other of the elongated frames to selectably hold the elongated frames in the closed position, the locking member being engageable with said other of the elongated frames by movement along the longitudinal axis toward the handles of said elongated frames;

a sleeve mounted over at least one of the handles, the sleeve including a slot formed therein; and a spring disposed in the slot and having a barb engaging the sleeve to retain the spring in the slot.

11. A hand tool, comprising:

first and second elongated frames each including a handle and a jaw;

a pivot pin extending through the first and second elongated frames to pivotably join them, the first and second elongated frames being movable between open and closed positions;

a sleeve mounted over at least one of the handles, the sleeve including a slot formed therein; and a spring disposed in the slot and having a barb engaging the sleeve to retain the spring in the slot.

12. The hand tool of claim 11 further comprising a hole in the first elongated frame adapted for receiving a fastener, said hole being the only support for the fastener, the second elongated frame having an edge which terminates at a shoulder, the first and second frames lying adjacent one another, the shoulder and hole being arranged such that when the elongated frames are in an open position the second elongated frame is nonaligned with the hole and as the elongated frames move to a closed position the shoulder moves across the entire hole to sever a fastener protruding from the hole.

13. The hand tool of claim 12 wherein the portion of the shoulder that moves across the hole has a curved configuration.

14. The hand tool of claim 11 further comprising a sleeve mounted over at least one of the handles, the handle having a free end and being connected at its other end to the jaw, the frames each defining a plane, one of the sleeve and said one handle including a groove and the other including a protrusion, the groove being spaced from the free end of the handle, and the protrusion extending transversely to the plane of the frame, the groove and protrusion interfitting with one another to retain the sleeve on said one handle.

15. The hand tool of claim 11 wherein the sleeve includes a core and a cushioned grip portion molded over the core, the core having a molding projection extending from one surface thereof a distance about equal to the thickness of the cushioned grip such that end of the molding projection is not covered by the cushioned grip.

16. The hand tool of claim 11 wherein the first and second frames lie adjacent one another in separate planes, and further comprising first and second sleeves mounted on the handles of the first and second elongated frames, respectively, each sleeve having front and rear walls joined by inside and outside edge walls, said front and rear walls and inside and outside edge walls defining a hollow slot in the sleeve for receiving a handle, the slot being offset from the center line between the front and rear walls such that the front wall of the first sleeve and the rear wall of the second sleeve are generally coplanar in one plane and the front wall of the second sleeve and the rear wall of the first sleeve are generally coplanar in a different plane.

* * * * *